July 3, 1962          A. M. VOGEL          3,042,032
BABY RESTRAINERS
Filed April 22, 1960
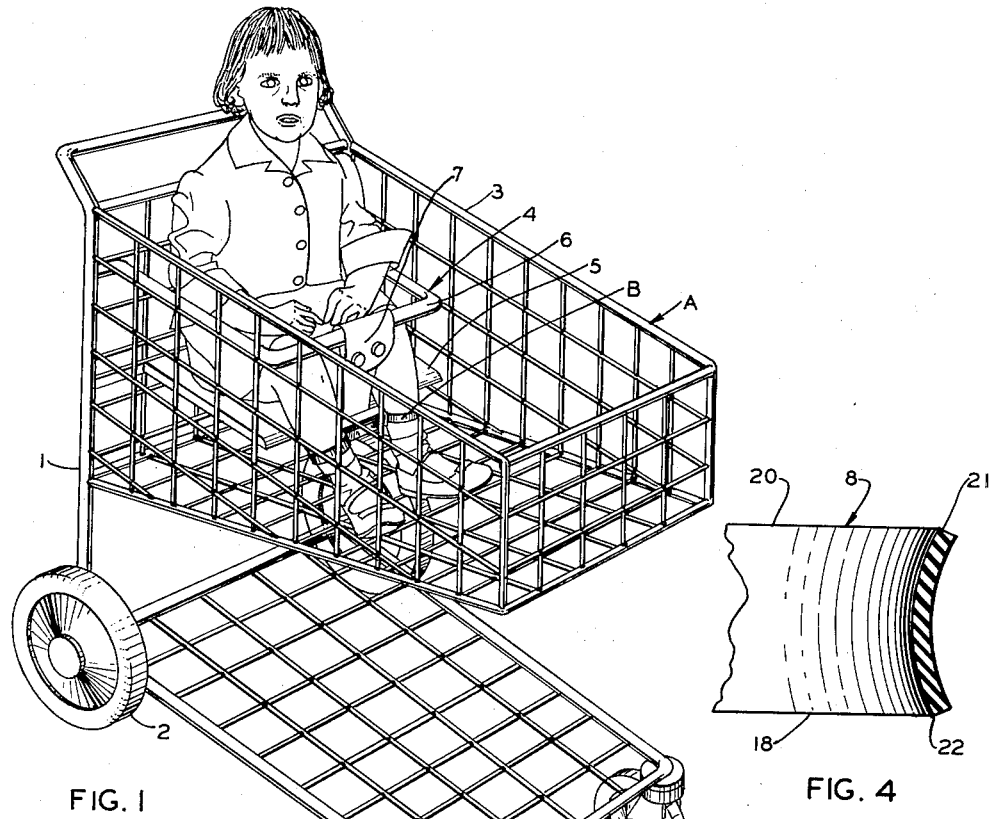
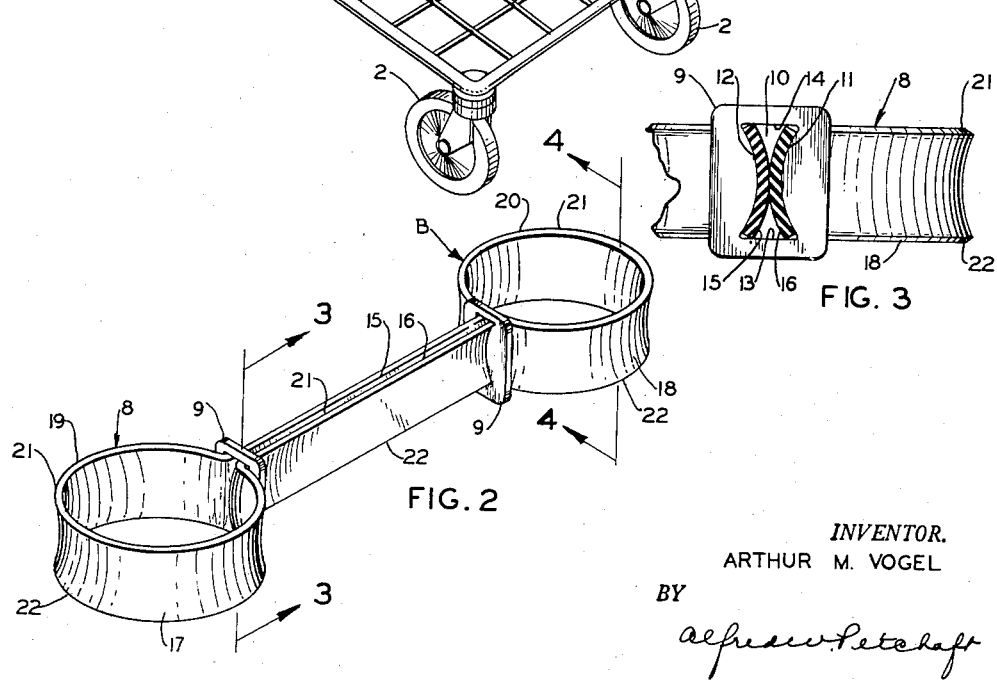
INVENTOR.
ARTHUR M. VOGEL
BY
Alfred W. Petchaft

United States Patent Office 3,042,032
Patented July 3, 1962

3,042,032
BABY RESTRAINERS
Arthur M. Vogel, 4712 Oak Ave., Gulfport, Miss.
Filed Apr. 22, 1960, Ser. No. 24,112
2 Claims. (Cl. 128—134)

This invention relates in general to baby restrainers and, more particularly, to baby restrainers adapted for use with portable baby carriers such as strollers, perambulators, and the baby-seats provided on many types of rolling baskets found in supermarkets.

In supermarkets, for example, it is common practice to provide rolling baskets having a seat located in a child-holding position so that the child may be transported in the grocery cart or basket while the parent is shopping. It has also been found that children in the ages of 1 to 3 years very frequently attempt to stand up in such seats and can fall out of the conveyance or possibly tip it over with resultant injury. Similar accidents can happen when a small child is placed in a sitting position in a stroller or perambulator.

It is the primary object of the present invention to provide an adjustable restrainer attached for disposition about the legs of a child for comfortably restraining the child within the seat of a conveyance of the type stated and thereby eliminate the danger of falling or similar accidents.

It is also an object of the present invention to provide a restrainer which is readily adjustable to fit children of varying sizes and ages.

It is a further object of the present invention to provide a child-restrainer of the type stated which is light in weight, and is relatively compact for purposes of transportability.

With the above and other objects in view, my invention resides in the novel features of form, construction, and arrangement of parts presently described and pointed out in the claims.

In the accompanying drawing—

FIG. 1 is a perspective view of a grocery cart holding a child held in the seat by a child-restrainer constructed in accordance with and embodying the present invention.

FIG. 2 is a perspective view of the child-restrainer of the present invention; and FIGS. 3 and 4 are fragmentary sectional views taken along lines 3—3, 4—4, respectively, of FIG. 2.

Referring now in more detail and by reference numerals to the accompanying drawing, which illustrates a preferred embodiment of the present invention, A designates a conventional grocery cart comprising a frame 1 mounted on rollers 2 and including an upper basket 3. Secured to the frame 1 within the basket 3 is a child's seat 4 including a seat base 5, an upper securing bar 6, and a crotch-strap 7 which is attached to the seat base 5 and the securing bar 6 in such a manner as to provide a straddling member for the child when placed in the child's seat 4. The grocery cart A is conventional and is illustrated herein merely for purposes of showing one preferred use of the present invention. Hence, the grocery cart A is not described in detail and only the major features are designated by reference numerals.

B designates a baby restrainer comprising a continuous endless elastic band 8 which is preferably, though not necessarily, formed of rubber. Shiftably mounted on the band 8 is a pair of slide-rings 9 of substantially rectangular shape and provided with an intermediate aperture 10, which is defined by a pair of complementary inwardly curving arcuate margins 11 and 12, and a pair of opposing spaced parallel transverse margins 13 and 14. The arcuate margins 11, 12, are oriented so that they are spaced more closely at the center than at the ends and the margins 13, 14, are spaced sufficiently close together so that the distance between the margins 13, 14, is substantially less than the width of the band 8, whereby the opposing portions 15, 16, of the band 8 which project through the aperture 10 in the slide-rings 9 are forced into a convex contour as shown in FIG. 3 and lie snugly against the arcuate margins 11, 12.

Thus, the slide-rings 9 cause the band 8 to cup transversely of its narrow dimension into a pair of leg loops 17, 18, which are joined by a pair of outwardly cupped connecting elements 19, 20. In other words, the spacing of the margins 13, 14, and the particular contouring of the arcuate margins 11, 12, of the slide-rings cause the upper and lower margins 21, 22, of the band 8 to be spaced outwardly from the center portion 23 of said band in the manner shown in FIGS. 3 and 4.

In use, the child is placed in the seat 4 and the slide-rings 9 are moved toward each other to cause the leg loops 17, 18, to increase in diametral size, whereby one of the child's feet and legs may be inserted therethrough. When the child's legs are properly within the apertures, the slide-rings 9 are moved outwardly and the leg loops 17, 18, are thereby reduced in size to fit the child's legs snugly, but, nevertheless, comfortably in the manner shown in FIG. 1 whereby the child is retained within the cart by the combination of the restrainer B and crotch-strap 7. It should be noted that because of the shaping of the apertures 10 of the slide-rings 9, the restrainer is very comfortable to the child in that the restrainer is concave with respect to the outer surface of the child's leg and, therefore, the edges of the band on the upper and lower margins 21, 22, are turned outwardly from the child's leg and will not cut in or chafe the child's flesh even when the child tries to forceably remove its legs from the restrainer B. It has been found that by use of the restrainer B, the child within a few seconds will become accustomed to the restraint and will be safely held within the seat.

The child is released by merely sliding the slid-rings 9 back towards the center of the connecting elements 19, 20, and enlarging diametrally the apertures defined by the leg loops 17, 18.

It should be understood that changes and modifications in the form, construction, arrangement, and combination of the several parts of the baby restrainer may be made and substituted for those herein shown and described without departing from the nature and principle of my invention.

Having thus described my invention, what I desire and claim to secure by Letters Patent is—

1. A baby restrainer comprising a continuous stretchable band having substantial width and a pair of plates each provided with an aperture, the band being placed through the apertures of the plates whereby each plate will be slidably mounted on the band and will respectively define diametrally adjustable loops at opposite ends of the band, the apertures in the plates being defined by a pair of opposing arcuate margins adapted to engage outwardly presented lateral faces of the band, said apertures also including a pair of opposing straight margins adapted to engage the longitudinal edges of the band, said arcuate margins being complementary and being spaced more closely together at their centers than at their ends, and the straight margins being separated by a distance substantially less than the width of the band, whereby the band will be caused to engage said arcuate margins and thereby caused to assume a concave shape.

2. The restrainer of claim 1 wherein the spacing between the centers of the arcuate margins is less than twice the thickness of the band whereby to establish frictional contact between the contiguous surfaces of the band within the apertures and also to establish frictional contact between the outer surfaces of the band and the arcuate margins of the plates.

References Cited in the file of this patent

UNITED STATES PATENTS

| | | |
|---|---|---|
| 391,637 | Moritz | Oct. 23, 1888 |
| 477,079 | Stoddard | June 14, 1892 |
| 2,610,670 | Grooms | Sept. 16, 1952 |
| 2,650,590 | Moore et al. | Sept. 1, 1953 |